(12) United States Patent
Brown et al.

(10) Patent No.: US 11,483,377 B2
(45) Date of Patent: Oct. 25, 2022

(54) PROMOTING TIME-BASED CONTENT THROUGH SOCIAL NETWORKING SYSTEMS

(71) Applicant: Twitter, Inc., San Francisco, CA (US)

(72) Inventors: Glenn Brown, New York, NY (US); Mike Park, Brooklyn, NY (US); Je Carr, Fairfield, CT (US)

(73) Assignee: Twitter, Inc., San Francisco, CA (US)

( * ) Notice: Subject to any disclaimer, the term of this patent is extended or adjusted under 35 U.S.C. 154(b) by 80 days.

(21) Appl. No.: 16/902,861

(22) Filed: Jun. 16, 2020

(65) Prior Publication Data

US 2020/0314170 A1   Oct. 1, 2020

Related U.S. Application Data

(63) Continuation of application No. 15/425,828, filed on Feb. 6, 2017, now Pat. No. 10,728,310, which is a
(Continued)

(51) Int. Cl.
*G06F 15/16* (2006.01)
*H04L 67/10* (2022.01)
(Continued)

(52) U.S. Cl.
CPC ......... *H04L 67/10* (2013.01); *G06Q 30/0251* (2013.01); *G06Q 50/01* (2013.01); *H04L 51/52* (2022.05); *H04L 65/611* (2022.05); *H04L 67/06* (2013.01); *H04L 67/289* (2013.01); *H04L 67/306* (2013.01); *H04L 67/53* (2022.05); *H04L 67/535* (2022.05); *H04W 4/06* (2013.01); *H04L 67/52* (2022.05)

(58) Field of Classification Search
CPC ..... H04L 51/32; H04L 65/4076; H04L 67/22; H04L 67/306
USPC ........................................................ 709/204
See application file for complete search history.

(56) References Cited

U.S. PATENT DOCUMENTS 8,380,803 B1   2/2013   Stibel et al.
8,949,889 B1 *  2/2015   Erdmann ............ G06Q 30/0242
                                            725/34
(Continued)

OTHER PUBLICATIONS

Prosecution History from U.S. Appl. No. 14/207,281, dated Dec. 7, 2015 through Sep. 21, 2016, 52 pp.
(Continued)

*Primary Examiner* — Anthony Mejia
(74) *Attorney, Agent, or Firm* — Smith Baluch LLP (57) ABSTRACT

Time-based media is distributed and promoted in a social networking environment. Accounts of a social networking system author social media content items (SMCIs) from which a social networking system infers relevance of content to users of those accounts. Content distributors submit time-based media content to the social networking system, which creates distributor SMCIs containing the time-based media content. Accounts are identified to receive distributor SMCIs based on SMCIs previously authored by those accounts as well as identifying information and the subject of the SMCI. Content promoters may add promotional material to distributor SMCIs, which the social networking service sends to additional accounts.

20 Claims, 8 Drawing Sheets

Related U.S. Application Data continuation of application No. 14/207,281, filed on Mar. 12, 2014, now Pat. No. 9,565,245.

(60) Provisional application No. 61/908,457, filed on Nov. 25, 2013.

(51) Int. Cl.

| | | |
|---|---|---|
| *H04L 67/306* | (2022.01) | |
| *H04L 67/06* | (2022.01) | |
| *G06Q 30/02* | (2012.01) | |
| *H04L 67/289* | (2022.01) | |
| *H04W 4/06* | (2009.01) | |
| *G06Q 50/00* | (2012.01) | |
| *H04L 51/52* | (2022.01) | |
| *H04L 65/611* | (2022.01) | |
| *H04L 67/53* | (2022.01) | |
| *H04L 67/50* | (2022.01) | |
| *H04L 67/52* | (2022.01) | |

(56) References Cited

U.S. PATENT DOCUMENTS

| | | | |
|---|---|---|---|
| 9,565,245 B1 | 2/2017 | Brown et al. | |
| 9,741,080 B1* | 8/2017 | Byrne | G06Q 40/00 |
| 10,728,310 B1 | 7/2020 | Brown et al. | |
| 2007/0186751 A1 | 8/2007 | Koike | |
| 2010/0217645 A1 | 8/2010 | Jin et al. | |
| 2011/0276400 A1 | 11/2011 | Kurnit et al. | |
| 2011/0295937 A1* | 12/2011 | Howard | G06F 9/44505 |
| | | | 709/203 |
| 2013/0073356 A1 | 3/2013 | Cooper et al. | |
| 2013/0086489 A1 | 4/2013 | Fleischman et al. | |
| 2013/0191740 A1* | 7/2013 | Bell | H04L 67/55 |
| | | | 715/273 |
| 2013/0205338 A1 | 8/2013 | Sinha et al. | |
| 2013/0268962 A1 | 10/2013 | Snider et al. | |
| 2013/0312049 A1 | 11/2013 | Niyogi et al. | |
| 2014/0019240 A1* | 1/2014 | Zhou | G06Q 30/0269 |
| | | | 705/14.53 |
| 2014/0052527 A1 | 2/2014 | Roundtree et al. | |
| 2014/0188997 A1 | 7/2014 | Schneiderman et al. | |
| 2014/0207568 A1* | 7/2014 | Rajaram | G06Q 30/0251 |
| | | | 705/14.49 |
| 2014/0279069 A1 | 9/2014 | Rubinstein et al. | |
| 2014/0330649 A1* | 11/2014 | Lyren | G06Q 30/0277 |
| | | | 705/14.66 |
| 2014/0365581 A1 | 12/2014 | Kennon et al. | |
| 2015/0067714 A1* | 3/2015 | Bhogal | H04N 21/25875 |
| | | | 725/25 |
| 2015/0081449 A1 | 3/2015 | Ge et al. | |
| 2015/0088622 A1* | 3/2015 | Ganschow | G06Q 30/0252 |
| | | | 705/14.5 |
| 2015/0127418 A1 | 5/2015 | Piepgrass et al. | |
| 2015/0135241 A1* | 5/2015 | Stoller | H04N 21/8133 |
| | | | 725/92 |
| 2015/0142583 A1* | 5/2015 | Shapiro | G06Q 50/01 |
| | | | 705/14.67 |
| 2015/0149289 A1 | 5/2015 | Clair | |
| 2015/0169744 A1* | 6/2015 | Walkingshaw | G06Q 30/0251 |
| | | | 707/738 |
| 2015/0278882 A1* | 10/2015 | Ju | G06Q 30/0246 |
| | | | 705/14.45 |
| 2016/0253715 A1* | 9/2016 | Xie | G06Q 50/01 |
| | | | 705/14.72 |
| 2018/0189283 A1* | 7/2018 | Barnett | G06Q 50/01 |

OTHER PUBLICATIONS

U.S. Appl. No. 14/207,281, by Glenn Brown et al., filed Mar. 12, 2014.

U.S. Appl. No. 61/908,457, by Glenn Brown et al., filed Nov. 25, 2013.

* cited by examiner

PROMOTING TIME-BASED CONTENT THROUGH SOCIAL NETWORKING SYSTEMS

CROSS REFERENCE TO RELATED APPLICATIONS

This application is a continuation of U.S. Non-Provisional application Ser. No. 15/425,828, filed Feb. 6, 2017, which is a continuation of U.S. Non-Provisional application Ser. No. 14/207,281, filed Mar. 12, 2014, which claims the benefit of U.S. Provisional Application No. 61/908,457, filed Nov. 25, 2013, the entire contents of each of which are hereby incorporated by reference.

BACKGROUND

Online social media services, such as social networking systems and content sharing platforms, provide an environment for discussing time-based media (TBM) content. Accounts may discuss TBM content posted by other accounts through social media content items (SMCIs). These SMCIs may be indirectly associated with TBM content about news events, television shows, movies, sporting events, or concerts. However, entities that create and distribute TBM content may not know which accounts are interested in the TBM content. Content distributors and promoters may reach a target audience indirectly through broadcasting, but they lack a mechanism to send supplemental TBM content to the target audience directly.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment is disclosed of a system, method, and computer readable storage medium to distribute and/or promote time-based media (TBM) content through a social networking system. Generally, the social networking system (SNS) receives account information as well as social media content items (SMCIs) authored by accounts. The SNS analyzes the information and the SMCIs to determine topics of interest to the account. During the airing of specific instances of TBM content, TBM content distributors author SMCIs identifying the currently airing TBM content, and in some cases including or linking to clips from the currently airing TBM content. These distributor SMCIs are intended to promote the currently airing TBM content so that users of SNS accounts will be enticed to alter what they are doing to experience the currently airing TBM content. The SNS is configured to identify potential recipients for these SMCIs. Additionally, content promoters may send promotional information to the SNS to modify the distributor SMCIs to include the promotional information. These modified SMCIs are similarly sent to interested SNS authors.

The disclosed embodiments beneficially allow for targeted publication of SMCIs to social network accounts that are interested in receiving the SMCIs. Inferring that a user of a social network account is viewing TBM content based on SMCIs enables delivery of additional TBM content relevant to the concurrently viewed TBM content. Content promoters may leverage the inferred information from the SNS to deliver promotional information to more audiences that are more likely to find the promotion relevant. Combining distributed TBM content with promotional information incentivizes users of social network accounts to view and otherwise interact with SMCIs containing TBM content. SMCIs sent by the SNS on behalf of content promoters deliver relevant TBM content to social network accounts that otherwise may not receive this TBM content.

Social Network Environment Overview

Figure 1:
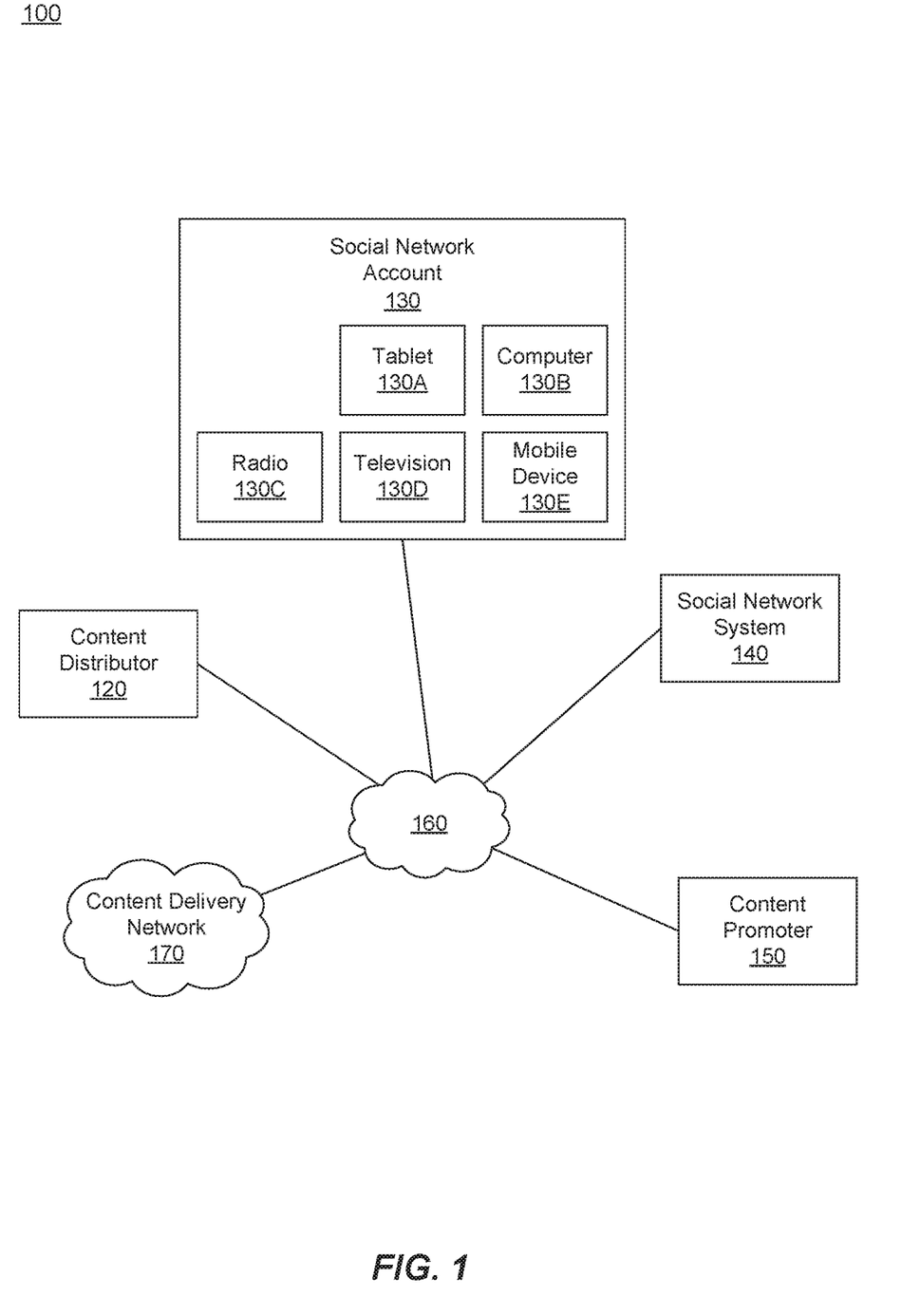
FIG. 1 illustrates example connections among agents interacting in a social network environment in accordance with one embodiment.

FIG. 1 illustrates example connections among agents interacting in a social network environment 100 in accordance with one embodiment. The agents include a content distributor 120, a social network account 130, a social network system (SNS) 140, a content promoter 150, a network 160, and content delivery network (CDN) 170. Multiple instances of the disclosed agents may be present in various embodiments. In an alternative embodiment, the functionalities of multiple agents may be merged, modified, or split into a functionally equivalent set of agents.

TBM content forms the basis of many interactions between authors of SMCIs and the SNS. TBM content includes media items having a time-based component such as broadcast television, videos, animations, audio recordings, musical instrument digital instrument (MIDI) sequences, and advertisements. Example TBM content includes a highlight from a sports event, a clip from a television program, and an excerpt of a radio show. TBM content contains images and text (e.g., as part of a preview of TBM content) or a reference to access TBM content indirectly associated with the SMCI. TBM content may offer interactive experiences for an account user (e.g., a video game, an advertisement that prompts a viewer to choose from multiple possible advertisements). TBM content can be obtained from a variety of sources, such as local or network stores, as well as directly from capture devices such as cameras, video recorders, microphones, and live broadcasts. It is anticipated that other types of TBM content within the scope of the disclosed embodiments will be developed in the future (e.g., 3D media, holographic presentations, immersive media, and so forth).

The content distributor 120 disseminates TBM content through network 160 to any agent configured to receive it, including the SNS 140, accounts 130, CDNs 170, and content promoters 150. TBM content may be provided through network 160, or outside it. For example, a content distributor 120 broadcasts TBM content over television, cable television, satellite television, radio, satellite radio. A content distributor 120 may stream TBM content over the network 160. Some TBM content may be multicast to individuals. For example, a content distributor 120 maintains TBM content on a computer server and transmits TBM content to requesting client devices over a network 160. The content distributor 120 may own the content (e.g., a baseball league that distributes broadcasts of baseball games through a baseball television network). In an embodiment, the content distributor 120 distributes the content on behalf of another entity that owns the content. For example, a basketball league may own the rights to broadcast basketball games, but sells the distribution rights to a broadcast television network that acts as a content distributor 120).

The SNS 140 includes social networks, blogs, news media, forums, user groups, etc. These systems generally provide a plurality of social network accounts 130 with the ability to communicate and interact with other accounts of the system. Social network accounts 130 (also referred to as authors) can typically author various social media content items (SMCIs) such as posts, videos, photos, links, status updates, blog entries, tweets, profiles, and the like. SMCIs may refer to TBM content (e.g., TV shows, advertisements) or other SMCIs (e.g., other posts, pages associated with TV shows or advertisements), and SMCIs allow authors to engage in discussions, games, online events, and other participatory services.

The social network account 130 refers to both the human user accessing TBM and interacting with SNS information, as well as the client device used to perform those actions. Exemplary client devices include a tablet 130A, a computer 130B, a radio 130C, a television 130D, and a mobile device 130E. In one embodiment, the content distributor 120 acts as a social network account 130 by uploading or providing access to TBM content to the SNS 140 and other accounts 130 via a SMCI. Similarly, content promoters 150 may also act as a social network account 130 by uploading or providing access to additional promotional information that is incorporated into distributor created SMCIs and provided to other accounts 130.

A computer 130B is a device having a non-transitory, computer-readable storage medium that stores instructions and a processor to execute those instructions. The computer 130B may have additional components to interface with the network 160, to display TBM content to the social network account 130, and to receive input from the social network account 130. For example, the computer 130B may communicate using an Ethernet or WiFi connection. The computer 130B may have a liquid-crystal or light-emitting diode display as well as a pointing device (e.g., a mouse, a touchpad) and an alphanumeric input device (e.g., a keyboard). The tablet 130A has many of the features of a computer 130B and in some embodiments incorporates a touch-sensitive screen. The mobile device 130E may comprise one or more components of the computer 130B and may contain components to communicate over a cellular network, including voice communication and data transfer (e.g., 4G).

A radio 130C receives broadcast TBM content using a receiver and transducer to produce audio signals. A television 130D may receive TBM content through broadcast signals or another network and present audio and visual information to the social network account 130. In an embodiment, the radio 130C or television 130D contains components of a computer 130D (e.g., a smart radio, a smart television).

The content promoter 150 owns promotional information that they wish to disseminate. The content promoter 150 may view or access TBM content and seek to add promotional information (e.g., advertisements, commercials, announcements, digital coupons) to the TBM content and/or to SMCIs authored by the distributor that reference or include TBM content indirectly associated with the SMCI. The content promoter 150 may own the promotional information or the content promoter 150 may be a separate entity working on behalf of the owner of promotional information (e.g., an external advertiser). For example, a movie studio may want to promote an action movie to male adults. The movie studio contracts with an advertising agency, acting as content promoter 150, to create a commercial about the action movie. The advertising agency identifies that viewers of basketball games are likely to enjoy the action movie, so the advertising agency contracts with at least one of the SNS 140 and/or the basketball distributor, acting as content distributor 120, to place promotional content alongside the basketball distributor's content. This may include placing a commercial in basketball TBM content directly, as well as placing promotional information in a SMCI authored by the basketball distributor.

The network 160 comprises a means of transmitting information between entities using both wireless and wired means. For example, a network includes wide-area and local-area networks such as electromagnetic broadcasting systems, satellite networks, cellular networks, fiber optic networks, cable networks, and the Internet. The network 160 may include multiple networks transmitting information with analog signals, digital signals, or a combination thereof.

The content delivery network (CDN) 170 receives, stores, and distributes SNS content, TBM content, and promotional information across network 160 using servers distributed across multiple data centers located in different geographical locations. A content delivery network 170 decreases delivery times for data by decreasing the distance between an account 130 and the data center transmitting the data. The servers of a content delivery network 170 split traffic and face lower processing demands than a central repository of data does. Additionally or alternatively, the individual agents may maintain their own stores of data and distribute data themselves rather than relying on external CDNs 170.

Social Network Server

Figure 2:
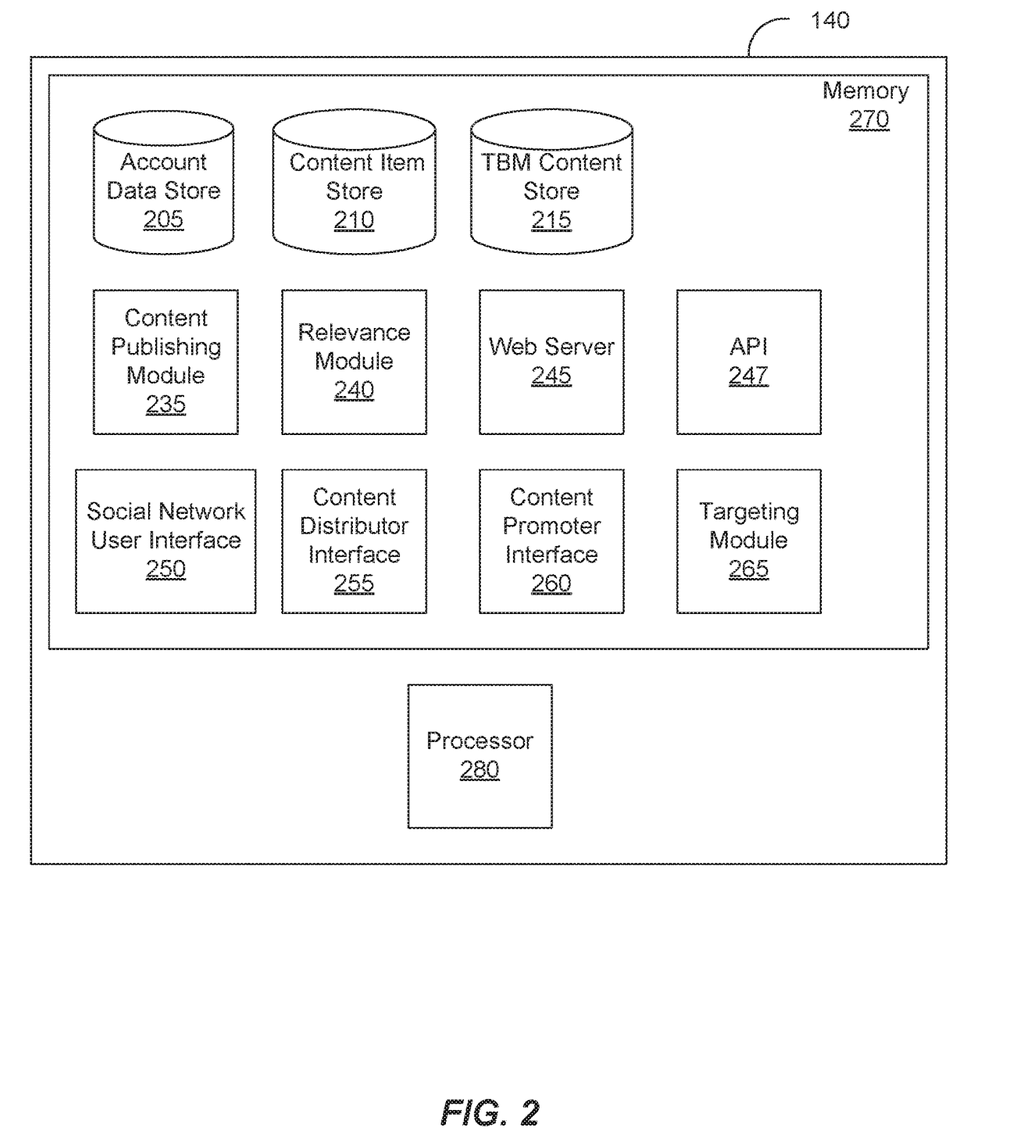
FIG. 2 illustrates example components of a social network system in accordance with one embodiment.

FIG. 2 illustrates example components of a SNS 140 in accordance with one embodiment. The SNS 140 may be implemented on a suitable device containing a memory 270 and a processor 280 (e.g., one or more servers). The memory 270 contains instructions describing an account data store 205, a content item store 210, a TBM content store 215, a content publishing module 235, a relevance module 240, a web server 245, an application programming interface (API) 247, a social network user interface 250, a content distributor interface 255, a content promoter interface 260, and a targeting module 265. For clarity of description, data store components are described first, content relevance and promotion components are described second, user interface components are described third, and other modules are described last.

Data Store Components

The account data store 205 stores information regarding accounts of the SNS 140. Examples of stored data include identifying information such as a user name, a password, one or more profile images, a user location, an associated website, a biography, an email address, a phone number, content preferences, privacy settings, demographic information, account associations with other accounts of the SNS 140, and associations with other social networking systems. Content preferences include interests or preferred topics or genres for the account, as explicitly provided by the account 130, or as inferred from their authored SMCIs. In an embodiment, content distributors 120 or content promoters 150 are themselves accounts of the SNS 140, and thus have corresponding entries in the account data store 205.

In one embodiment, the account data store 205 contains connection information forming a connection graph. The graph may contain unidirectional and/or bidirectional connections. For example, an account may "follow" a source account and is, therefore, subscribed to receive messages from the source account. In this example, graph data associated with the account indicates a unidirectional connection to the source account. As a second example, two accounts may connect with each other, forming a bidirectional connection. In this second example, each of the two accounts receives messages published by the other account.

The account data store 205 logs account actions on the SNS 140. Example account actions in the SNS 140 that are logged include adding a connection to another account, authoring a SMCI, sending a SMCI to another account, and reading a SMCI from another account. The account data store 205 logs a date and time corresponding to a logged action. The account data store 205 may include logged actions from an external social networking system associated with the account. These logged account actions may be used to determine relevance of TBM content or a SMCI to a social network account 130. For example, a social network account 130 authors a SMCI that mentions a content topic. The action is logged and the relevance module 240 infers that the mentioned content topic is relevant to the account. The relevance module 240 stores the association between the mentioned topic and the SMCI author in the account data store 205.

The account data store 205 additionally contains relevance data used to estimate relevance of TBM content or a SMCI to a social network account 130. The relevance module 240 determines relevance of a content topic to an account and stores this data in the account data store 205. For example, stored data indicates an account's attitudes towards instances of TBM content such as a broadcast sports game from a particular team, an episode in a science-fiction adventure series, or a nightly newscast. The stored data also indicates an account's attitudes towards a content topic such as baseball, Alec Baldwin, or puppies, for example. The data may additionally indicate that particular topics are relevant to various aggregations of accounts having one or more similar or identical characteristics, e.g., particular demographic groupings of social network accounts 130.

The content item store 210 contains entries relating to SMCIs that a social network account 130 has authored and submitted to the SNS 140 for publication. These SMCIs may be sent to or accessed by other accounts using the content publishing module 235 depending on publication and privacy settings of those other accounts. When a SMCI is indirectly associated with TBM content, the corresponding entry in the content item store 210 contains a reference to the associated TBM content. In an embodiment, the content item store 210 also stores a text or image preview associated with TBM content that is indirectly associated with or included in individual SMCIs.

The TBM content store 215 contains TBM content itself and/or references to TBM content stored elsewhere (e.g., on a CDN 170). The TBM content stored in the TBM content store 215 is submitted by social network accounts 130, some of which may be content distributors 120. Some of the stored TBM content may be promotional information. The TBM content store 215 may store metadata about the TBM content such as a title, a description, a content source, one or more content topics, and distribution metadata. Metadata associated with TBM content may be received through the social network user interface 250 and the content distributor interface 255. Metadata may be retrieved from an external database (e.g., an electronic programming guide, a media database, a marketing demographics database, a database a content distributor 120 has provided to the SNS 140

Content topics include a genre (e.g. sports, comedy, drama), a subgenre (e.g., football, sketch comedy, crime drama), an event (e.g., a news event, a sporting event, a holiday, an auction), a personality (e.g., an athlete, an actor, a character, a celebrity, a politician), or an entity (e.g., a sports team, a corporation, a non-profit, a government agency), a location (e.g., a sports venue, a restaurant, a town, a region, a country, a natural geographical feature), or objects (e.g., an animal, a plant, a food, a machine).

Distribution metadata may include distribution channels (e.g., broadcast channels, cable channels, satellite channels, radio stations, websites) along with corresponding geographic distribution locations and airing times/dates. Distribution metadata may include target or anticipated audience information such as demographic and/or geographic profiles broken down by distribution channel.

For example, a television clip in the TBM content store 215 may have associated distribution metadata about networks on which the television clip was aired or is airing, as well as airing times and geographical locations. The example television clip may have additional distribution method metadata about Internet distribution including websites, overall popularity, popularity among different demographic groups, and popularity in different geographical regions, for example. If the television clip shows a football game, example associated content topics include sports (a genre), football (a subgenre), the football game (an event), athlete names, coach names, and announcer names (personalities), and team names (entities). The example football game television clip may include additional metadata such as statistics and scoring information associated with the athletes, the venue, and the football game. If the television clip shows a television drama, for example, content topics includes the drama's characters, actors, director, and writers (personalities) as well as the television network and the studio that produced the television clip (entities). Example distribution metadata may include broadcasting times and channels as well as demographic information associated with previous airings of the television drama. One or more CDNs 170 may provide at least part of the functionality of the TBM content store 215, in one embodiment.

Content Relevance and Promotion Components

The relevance module 240 determines the relevance of TBM content to particular social network accounts 130. To make determinations of relevance, the relevance module 240 accesses topics determined to be of interest to SNS accounts 130, and cross correlates them with topics tagged as associated with TBM content. For example, if the relevance module 240 determines that an account has authored SMCIs about bumblebees, it determines that future SMCIs and TBM content about bumblebees are relevant to the account. As another example, the relevance module 240 may determine that an account is interested in Nicholas Cage because the account has interacted with SMCIs containing TBM content featuring Nicholas Cage. The relevance module 240 may also consider graph data to determine relevance. For example, if an account is following source accounts similar to other accounts that are inferred to be interested in a topic, then that account is inferred to also be interested in the topic.

In addition to relevance based on information stored regarding the account, the relevance module 240 may also determine relevance based on temporal factors. For example, suppose an account has authored SMCIs about po' boy sandwiches most frequently around the middle of the day. The relevance module 240 might infer that po' boy sandwiches are most relevant to the account around lunchtime, so the targeting module 265 sends SMCIs about sandwiches to the account before or during lunchtime. As another example, if an account authors SMCIs about football on fall and winter Sundays, then the relevance module 240 may determine that football-related content is most relevant to the account on Sundays during the fall and winter. Alternately or additionally, the relevance module 240 determines when football is most relevant to an account based on football schedules accessed through the web server 245 (e.g., accessing an electronic program guide). As another example, suppose an account authors SMCIs that mention a television comedy. The relevance module 240 determines that the television comedy is relevant to the account. Using a television schedule, the relevance module 240 notes that the television comedy has increased relevance to the account during a broadcast of the comedy in the account's geographic market.

The content publishing module 235 sends SMCIs authored by social network accounts 130. The SMCIs may be indirectly associated with TBM content from the TBM content store 215. In one embodiment, the content publishing module 235 identifies accounts to receive SMCIs based on graph data indicating unidirectional connections of the author. For example, the content publishing module 235 identifies accounts to receive a SMCI because those accounts are subscribed to the SMCI's author. In the same or in a different embodiment, the content publishing module 235 may allow the social network account 130 to determine what other accounts receive the SMCI. The account may specify as few accounts as a single account to receive the SMCI. The content publishing module 235 further allows the SMCI author to associate the SMCI with one or more content topics.

In another embodiment, the content publishing module 235 sends SMCIs authored by a content distributor 120 or a content promoter 150. The content publishing module 235 interfaces with the targeting module 265 to identify potential recipients of a SMCI. For example, if an author of the SMCI is a content distributor 120 or promoter 150, the author may request that the SMCI be sent to all accounts that find the topic relevant, based on the determination of the relevance module 240. The author of the SMCI may further specify a subset of accounts that are interested in one or more specified topics (e.g., a subset based on geography and/or demographics). The content publishing module 235 may be configured to send SMCIs to social network accounts that have a determined interest in the content topics associated with the SMCI. Depending on privacy settings of the account 130, the content publishing module 235 may also post the SMCI on a publicly accessible webpage at the discretion of the SMCI author. The content publishing module 235 may send the SMCI as part of a message stream structured by the social network user interface.

The targeting module 265 infers a social network account's interest in viewing a SMCI containing TBM content. The targeting module 265 combines data in the account data store 205 and TBM content store 215 with external data accessed through the web server 245. Based on determining an account's interest in a SMCI containing TBM content, the targeting module 265 determines whether to send the SMCI to the account. The targeting module 265 receives SMCI information from the promoter interface 260, but in an alternate embodiment, the targeting module 265 receives information from the content distributor interface 255 or social network user interface 250. For example, the targeting module 265 receives a SMCI containing TBM content about a football game. The targeting module 265 determines that Peyton Manning is playing in a broadcast football game, so the targeting module 265 retrieves accounts that are interested in Peyton Manning from the account data store 205. The targeting module 265 determines accounts that are interested in Peyton Manning and multicasts the SMCI to those accounts. The targeting module 265 may consider graph data in determining an account's interest. For example, if an account is identified to receive a SMCI containing TBM content, the targeting module 265 may consider accounts subscribed to that account to also receive the SMCI.

User Interface Components

The social network user interface 250 provides a user interface for viewing and authoring SMCIs that is accessible via client devices.

The content distributor interface 255 provides similar functionality to the social network user interface 250 but provides a content distributor 120 additional functionality for SMCI generation. In one embodiment, the content distributor interface 255 is configured to receive one or more streams of TBM content. A content distributor 120 creates an account through the content distributor interface 255, which can be configured to associate one or more live streams of TBM content (e.g., a television broadcast) with the account (e.g., in response to an account selection). The content distributor interface 255 can be configured to present a visual representation of the stream to an account, and to receive a selection of one or more portions of the stream from the account. The content distributor interface 255 then constructs a SMCI and associates the selected portion of the stream with the SMCI along with, optionally, additional input from the account (e.g., a message, caption, description, etc.). The content distributor interface 255 then sends the distributor SMCI through the content publishing module 235 or sends the SMCI to another social network for distribution. The content distributor interface is further configured to suggesting content promoters 150 that are likely to promote the content distributors' TBM content.

The content promoter interface 260 provides similar functionality to the social network user interface 250 but provides a content promoter 150 additional functionality for identifying SMCIs to promote. The content promoter interface 260 suggests SMCIs containing TBM for the content promoter 150 to promote. The suggestion interface 250 uses the content promoter's expressed preferences, topic information from the TBM content store 215, and data from the account data store 205 to determine the SMCIs that the content promoter 150 may be interested in promoting.

A content promoter 150 may select SMCIs containing TBM content and modify them through the content promoter interface 260. The content promoter 150 may modify a description of the SMCI, modify the TBM content (e.g., selecting a segment of TBM content, adding promotional TBM content), and add an image to the SMCI (e.g., a logo, a banner advertisement).

The content promoter interface 260 further provides a content promoter 150 with options to select social network accounts 130 to receive the promoted SMCI. In one embodiment, in one embodiment, the content promoter interface 260 grants access to enhanced analytic information (e.g., demographic breakdowns of account interactions with SMCIs promoted by the content promoter 150). The content promoter 150 uses this information to select groups to receive the promoted SMCI (e.g., based on inferred interest, demographics, geography, or a combination thereof).

Other Components

The web server 245 links the SNS 140 to the network 160 and other agents coupled thereto, and is one means for doing so. The web server 245 may include messaging functionality for receiving and routing data between the agents. The web server 245 serves web pages, as well as other web related content, such as Java, Flash, and so forth. Example web pages may be represented using HyperText Markup Language (HTML), Extensible Markup Language (XML), JavaScript Object Notation (JSON), and PHP: Hypertext Preprocessor (PHP).

The API 247, in conjunction with web server 245, allows one or more external entities to access information from the SNS 140. The web server 245 may also allow external entities to send information to and/or receive information from the SNS 140 through the API 247. For example, an external entity sends an API request to the SNS 140 via the network 160 and the web server 245 receives the API request. The web server 245 processes the request by calling an API 247 associated with the API request to generate an appropriate response, which the web server 245 communicates to the external entity via the network 160.

Sending Distributor SMCIs for Concurrently Airing TBM Content

Figure 3A:
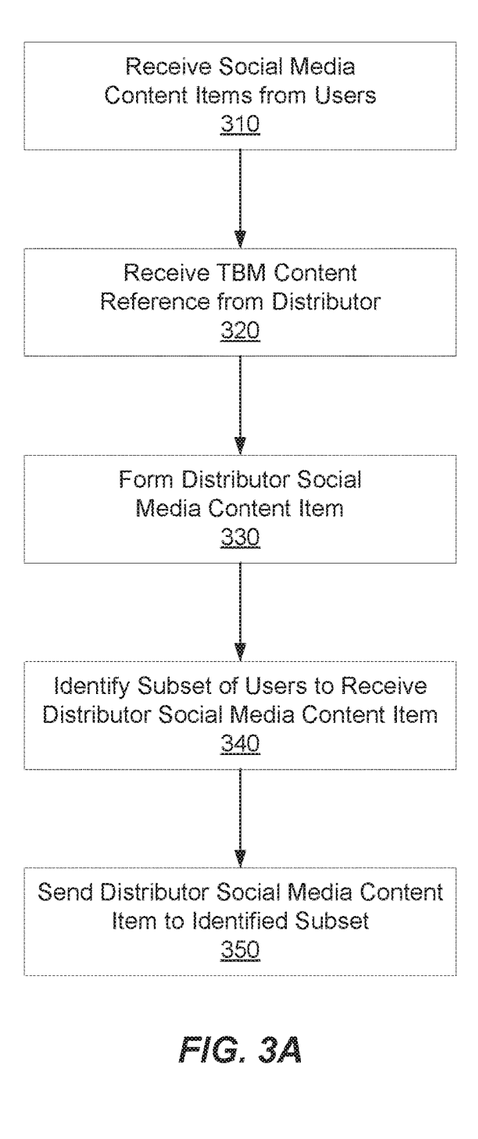
FIG. 3A illustrates a flowchart of an example process for creating a distributor SMCI referencing TBM content in one embodiment.

FIG. 3A illustrates an exemplary method for distributing SMCIs referencing TBM content through a social network, in one embodiment. The SMCIs are distributed to accounts that may be interested in TBM content, and/or the SMCIs are distributed to accounts of users concurrently viewing content relating to the indirectly associated TBM content. The social network user interface 250 receives 310 SMCIs authored by social network accounts 130. To construct the SMCI for the content distributor, the SNS 140 receives 320 a TBM content reference from a content distributor 120. The TBM content may contain a segment of TBM content that is currently airing at that point in time (e.g., where the TBM content is a local sporting event currently being broadcast on a local TV channel). In one embodiment, the indirectly associated TBM content is related to another piece of TBM content. For example, if a movie is airing on TV, the TBM content indirectly associated with the distributor SMCI may include director commentaries, cast interviews, and making-of specials that are available within a window of time of viewing the movie. In another embodiment, the indirectly associated TBM content is a portion of a more complete, concurrently broadcast TBM content. For example, if a basketball game is currently airing on TV, the indirectly associated TBM content show a replay, an advertisement, and commentary about the basketball game that has already occurred during that broadcast. The TBM content indirectly associated with the SMCI may be the same as or may be different from the concurrently broadcasted TBM content. Generally, the two pieces of TBM content are related in some way, so as to drive account user interest to the currently broadcasted TBM item.

The content distributor interface 255 forms 330 a distributor SMCI. The formed distributor SMCI includes the received TBM content (or a reference thereto), descriptive text, and any metadata such as content topics associated with the indirectly associated TBM content for identifying potential recipients for the distributor SMCI. The targeting module 265 identifies 340 a subset of social network accounts 130 to receive the distributor SMCI. For example, the subset of accounts may be identified based on graph data (e.g., the identified accounts follow SMCIs posted by the content distributor 120). The accounts in the identified subset have preferences to receive SMCIs with particular characteristics such as particular descriptive text, tags, or metadata, for example. In one embodiment, the content publishing module 235 posts the distributor SMCI to a webpage through the web server 245. The webpage may be public or may restrict access to one or more particular social network accounts 130, or groups thereof, based on preferences of the SMCI author (e.g., the content distributor 120).

The content publishing module 235 sends 350 the distributor SMCI to the identified subset of social network accounts 130. The social network user interface 250 is structured to display the sent distributor SMCI. In an alternate embodiment, accounts in the identified subset may access the distributor SMCI through the API 247. Sending a SMCI includes broadcasting the SMCI to accounts that have a connection to the author account as well as other accounts. For example, an account that searches for SMCIs having a given topic, category, keyword, or search term may view the sent SMCI. As another example, a webpage may display the sent SMCI (e.g., a profile page of the SMCI author, an external page that includes the SMCI embedded in other content, a webpage that aggregates SMCIs of interest to an account). A sent SMCI may be viewed through an application (e.g., an application provided by the SNS 140, an external application that aggregates SMCIs and/or other content). Sending a SMCI may include multicasting as well, where one or accounts are selected to receive the SMCI. A SMCI may be both multicast and broadcast. For example, an account is selected to receive a multicast SMCI that has been broadcast. The multicast SMCI is featured in a social network user interface 250 personalized for the recipient account. One embodiment of the social network user interface 250 is described in FIGS. 5A-5D.

For example, a content distributor 120 such as a television network broadcasts a baseball game. While the baseball game is airing, the television network creates a TBM content clip showing a homerun from the baseball game that has already occurred. The SNS 140 receives 320 from the television network a SMCI containing the homerun replay, a description for the replay (e.g. "What a Hit! % MLZ % BigHits"), and metadata identifying baseball as a content topic. The SNS 140 forms 330 a distributor SMCI and identifies 340 a subset of accounts that have subscribed to MLZ SMCIs or who are interested in baseball. The content publishing module 235 sends 350 the distributor SMCI to the identified subset of social network accounts 130, who may access a replay of the homerun. Some users of the identified accounts may not be already watching the broadcast baseball game when they receive the distributor SMCI, and are incentivized to do so as a result of having received the SMCI.

Sending Promoted SMCIs for Concurrently Airing TBM Content

Figure 3B:
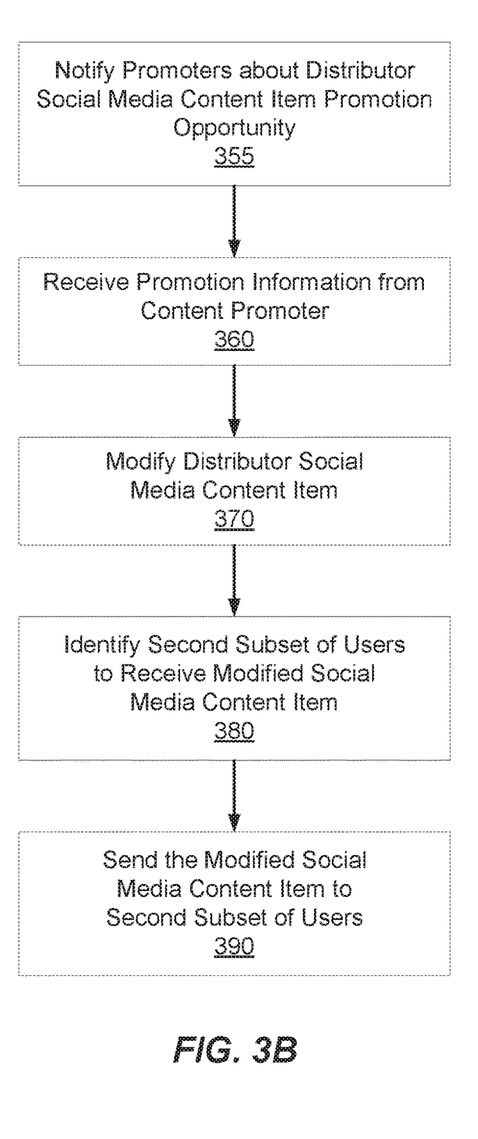
FIG. 3B illustrates a flowchart of an example process for modifying and promoting a distributor SMCI in one embodiment.

FIG. 3B illustrates an exemplary method for modifying and promoting distributor SMCIs, in one embodiment. In one embodiment, when the content distributor interface 255 forms 330 a distributor SMCI, the content promoter interface 260 notifies 355 relevant content promoters 150. For example, a content promoter's preferences indicate to notify 355 the content promoter 150 when a content distributor 120 creates a SMCI indirectly associated with TBM content related to concurrently broadcast TBM. The content promoter 150 may further request to receive notification when a distributor SMCI is formed that has metadata indicated by the content promoter. For example, an electronic dance music concert promoter is notified about distributor SMCIs with metadata indicating content topics related to concurrently broadcast electronic music. Preferences may specify demographic groups associated with a SMCI based on metadata (e.g., a SMCI with metadata indicating a target audience of young, unmarried adults). The notification may occur using the web server 245, the API 247, or the content promoter interface 260.

After receiving a notification about a distributor SMCI, a content promoter 150 chooses to promote the SMCI. Alternatively or additionally, a content promoter 150 may choose to promote a distributor SMCI without a notification. Alternately or additionally, a content distributor 150 promotes distributor SMCIs selected by the SNS 140 according to preferences of the content distributor 150. The SNS 140 receives 360 promotional information from the content promoter 150. The received promotional information may include additional TBM content (e.g., a commercial), text (e.g., slogans, attribution, an advertisement headline, advertisement body text), or images (e.g., a logo, an advertisement visual, a banner advertisement). In an alternative embodiment, a content promoter 150 sends promotional information to the SNS 140 with instructions to automatically insert the promotion information into distributor SMCIs meeting criteria specified by content promoter preferences.

The SNS 140 modifies 370 the distributor SMCI to include the promotional information. For example, modifying the distributor SMCI may include inserting TBM content from the promoter into the distributor TBM content. In an alternate embodiment, the promoter 150 may edit or remove portions of the distributor TBM content. As another example, the SNS 140 modifies 370 the distributor SMCI by inserting text or images as overlays in the distributor TBM content. In one embodiment, the content promoter 150 modifies the TBM content; modifying the distributor SMCI includes replacing the distributor TBM content with the TBM content from the promoter. In an alternate embodiment, the content promoter interface 260 includes tools for modifying the distributor TBM content. The modified SMCI may have additional images or text added such as a banner advertisement surmounting the TBM content player. In one embodiment, the modified SMCI still identifies the content distributor 120 as the author.

After modifying the distributor SMCI, the SNS 140 selects accounts to receive the modified SMCI. The targeting module 265 identifies 380 a second subset of accounts to receive the modified SMCI based on the SMCI, known information about social network accounts 130 (e.g., interests, graph data), and content promoter preferences. For example, an energy drink maker (a content promoter 150) promotes a SMCI with TBM content related to concurrently broadcast electronic music. The targeting module 265 identifies accounts interested in content topics associated with the broadcast TBM such as the electronic music genre and the electronic music DJ (disc jockey).

After selecting the second subset of accounts to receive the modified SMCI, the SNS 140 sends 390 the modified SMCI to the second subset of accounts. The targeting module 265 sends the modified SMCI through the web server 245 to the second subset of accounts, who may then view the modified SMCI in the social network user interface 250. Sending the modified SMCI may include broadcasting and/or multicasting, as described previously. For example, the social network account 130 may view the modified SMCI as part of a stream of SMCIs generated by the social network user interface 250. As another example, the social network user interface 250 generates a push notification on a client device belonging to the targeted social network account 130.

For example, suppose a football fan (a social network account 130) has created several SMCIs about football players. The relevance module 240 infers from the SMCIs that the football fan looks favorably on football (a content topic). The football league (a content distributor 120) uploads TBM content showing a replay of a blocked field goal from a concurrently airing football game, from which the SNS 140 forms 330 a distributor SMCI. The SNS 140 sends 350 the distributor SMCI to accounts subscribed to receive SMCIs from the football league, who can view the blocked field goal replay by interacting with the distributor SMCI. Other accounts, including the football fan, do not receive the distributor SMCI. A pizza company (a content promoter 150) chooses to promote the distributor SMCI. The pizza company submits a brief commercial (promotional information) to the SNS 140, which forms a modified SMCI. The targeting module 265 identifies 380 a second subset of accounts and sends 390 the modified SMCI to them. Since the football fan has a known interest in the content topic of football, the football fan is identified 380 and receives the modified SMCI. When the football fan views the TBM content in the modified SMCI, the football fan sees the pizza advertisement and then the blocked field goal replay.

As a further example, suppose a social network account 130 authors a SMCI about a football game while viewing a broadcast of that game. The relevance module 240 infers that the account's user is viewing the broadcast of the game. For the remaining duration of the broadcast game, the targeting module 265 identifies 380 the account to receive modified SMCIs that contain promotional information and TBM content from the football game.

Inferring that the account's user is viewing the broadcast game may also account for demographic information, geographic location, and knowledge of broadcast content in that geographic location. The demographic information and geographic location may be provided by the social network account 130 or may be inferred from SMCIs authored by the social network account 130. For example, an account authors numerous SMCIs referring to people or topics germane to broadcast TBM content. Based on the timing of the SMCIs and the timing of the broadcast TBM content across various geographic areas, the geographic area of the social network account 130 is inferred. Based on known demographics of viewers of TBM content, the demographics of a social network account 130 authoring SMCIs about those TBM content are inferred. As another example, the location of a social network account 130 is inferred from authored SMCIs about weather correlated with an external database about weather. Finally, account content preferences may be inferred from the content of authored SMCIs about TBM content and metadata corresponding to the TBM content.

Interacting in a Social Networking Environment

Figure 4:
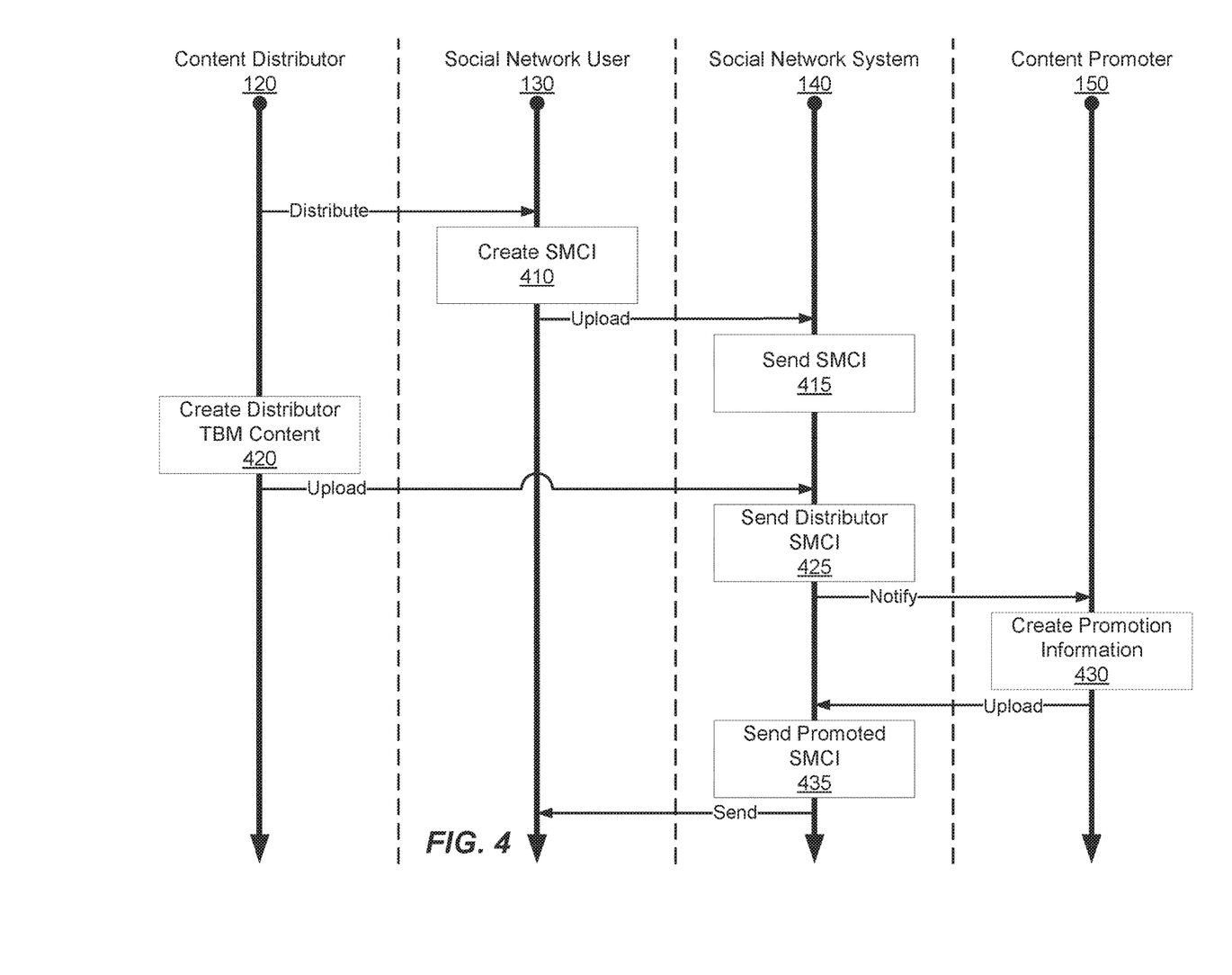
FIG. 4 illustrates example interactions among agents interacting in a social network environment in accordance with one embodiment.

FIG. 4 illustrates agents interacting in the social network environment 100, in one embodiment. A content distributor 120 distributes TBM content to a social network account 130. The TBM content may be broadcast or multicast using example methods described above. A first social network account 130 receives the TBM content and creates 410 a SMCI. For example, a first social network account 130 views a broadcast baseball game and authors a SMCI reacting to a thrown pitch. The web server 245 receives the uploaded SMCI, and the content publishing module 235 sends 415 the SMCI. Continuing the previous example, other social network accounts 130 following the first social network account 130 receive the SMCI about the thrown pitch. Various social network accounts 130 may create SMCIs, which are sent 415.

Independently of the social network accounts 130, the content distributor 120 creates 420 TBM content and uploads the TBM content through the content distributor interface 255 during the broadcast of the TBM content. Additionally or alternatively, the content distributor selects a segment of TBM content using the content distributor interface 255. The content publishing module 235 sends 425 a distributor SMCI including the received TBM content during the broadcast of the TBM content. Social network accounts 130 receive the distributor SMCI during the broadcast of the TBM content. For example, a baseball league (a content distributor 120) creates a distributor SMCI featuring two double play replays. A social network account 130 who follows the baseball league receives the distributor SMCI, which contains a link to a video of the two double play replays. In this way, content associated with live and/or currently broadcasting TBM content (e.g., a sports replay) can be selected by a content distributor 120, multicast by the content publishing module 235 in a distributor SMCI, and made available for viewing, promotion, analysis, and/or further propagation by others.

The content promoter interface 260 notifies a content promoter 150 about the distributor SMCI through the content promoter interface 260 during the broadcast of the TBM content. The content promoter 150 creates 430 promoter information and uploads the promoter information through the content promoter interface 260 during the broadcast of the TBM content. The content promoter interface 260 modifies the distributor SMCI. For example, a burger chain (a content promoter 150) creates promotional information including a banner ad and short video about double quarter-pounder burgers. The promotional information is uploaded through the content promoter interface 260, which adds the banner ad to the distributor SMCI and the short video to the TBM containing two double play replays in the distributor SMCI. The targeting module 265 sends 435 the modified SMCI during the broadcast of the TBM content. Continuing the previous example, the modified SMCI is multicast to social network accounts 130 who have authored SMCIs indicating they are watching the baseball game. When these social network accounts 130 open the SMCI, they see the modified TBM content featuring an ad for a double quarter-pounder burger sandwiched between two double play replays.

Example User Interface

Figure 5A:
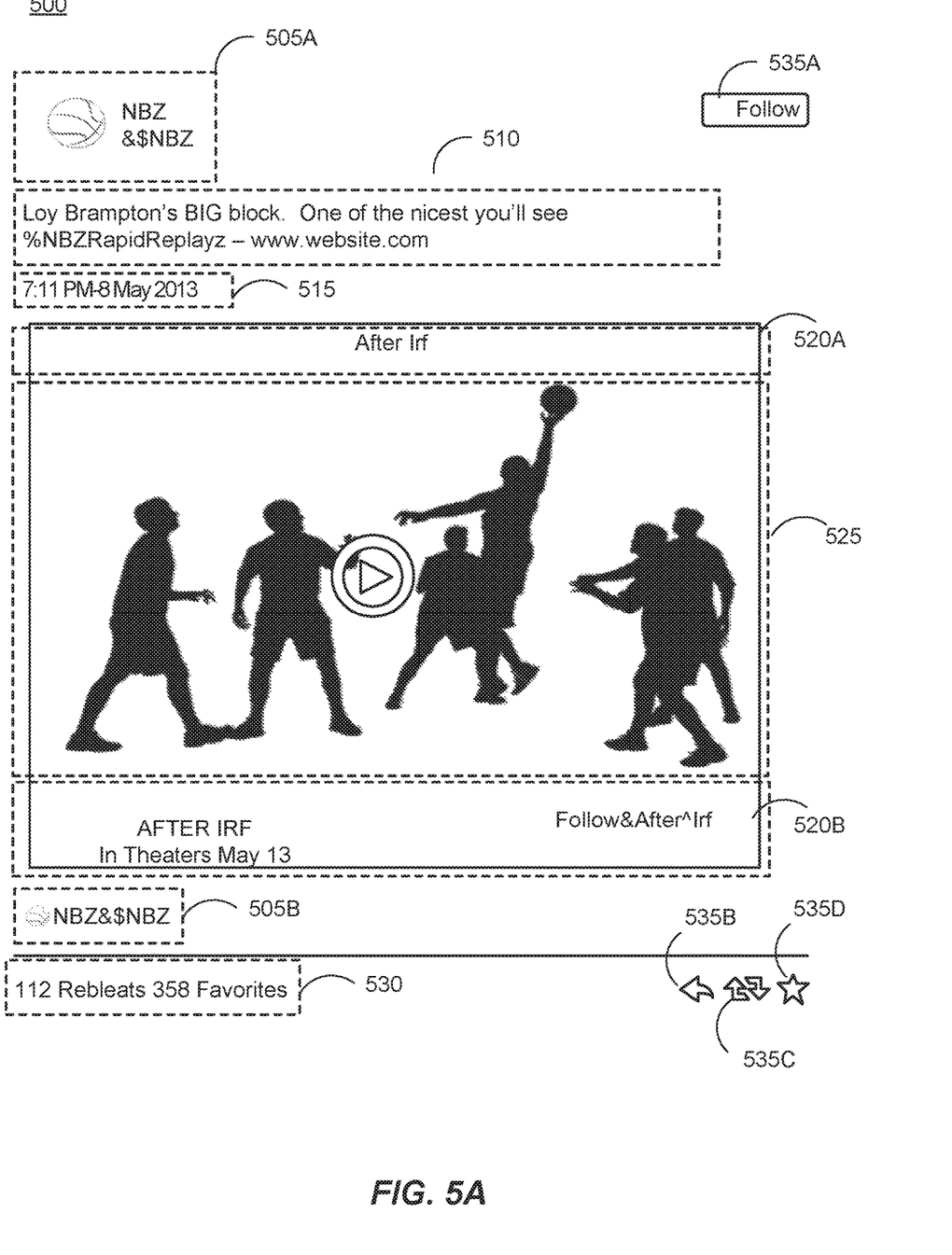
FIGS. 5A-5D illustrate an example user interface for displaying a modified SMCI identifying TBM content and promotion information in one embodiment.

FIGS. 5A-5D show an example user interface for displaying a modified SMCI identifying TBM content and promotion information, in one embodiment. FIG. 5A shows a promoted SMCI 500 as the SMCI initially appears in an example user interface generated by the social network user interface 250. The promoted SMCI 500 includes an author identifier 505, a textual description 510, a timestamp 515, banner advertisements 520, a TBM player 525, SMCI statistics 530, and SMCI interaction options 535. The author identifiers 505A and 505B indicate the author's name (NBZ) and user name ($NBZ) on the SNS 140 as well as a logo associated with the author. In this case, the NBZ (national basketball zone) is the content distributor 120 for the example promoted SMCI 500. The textual description 510 describes the TBM content and includes a descriptive tag (% NBZRapidReplayz) as well as a link to a website. The timestamp 515 indicates when the TBM content was received through the web server 245 on the SNS 140 and sent 425.

The banner advertisements 520A and 520B contain promotional information such as text and images created by a content promoter 150 for a new movie "After Irf" The TBM player 525 contains a reference to TBM content showing a basketball replay. The TBM player 525 shows a preview of the basketball replay and an icon to initiate the replay. When a social network account 130 selects the TBM player 525, the TBM content is retrieved and played as illustrated in FIGS. 5B-5D.

The SMCI interaction options 535 may be selected by accounts of the SNS 140 to interact with the promoted SMCI 500. A social network account 130 selects the follow option 535A to receive further SMCIs from the content distributor 120 indicated by the author identifier 505. The replay option 535B may be selected to author a SMCI directed at the content distributor 120. A social network account 130 selects the share option 535C to send the promoted SMCI 500 to the social network account's followers. The favorite option 535D is selected to mark the promoted SMCI 500 as a favorite. The SNS 140 logs account actions performed with the SMCI interaction options 535. The relevance module 240 uses these logged actions to infer content topics of interest to the account. The SMCI statistics 530 indicate the popularity of the promoted SMCI 500 among social network accounts 130. One SMCI statistic 530 indicates how many social network accounts 130 have shared the distributor SMCI with their followers using the share option 535C. Another SMCI statistic 530 indicates how many have marked the distributor SMCI as a favorite with the favorite option 535D.

Figure 5B:
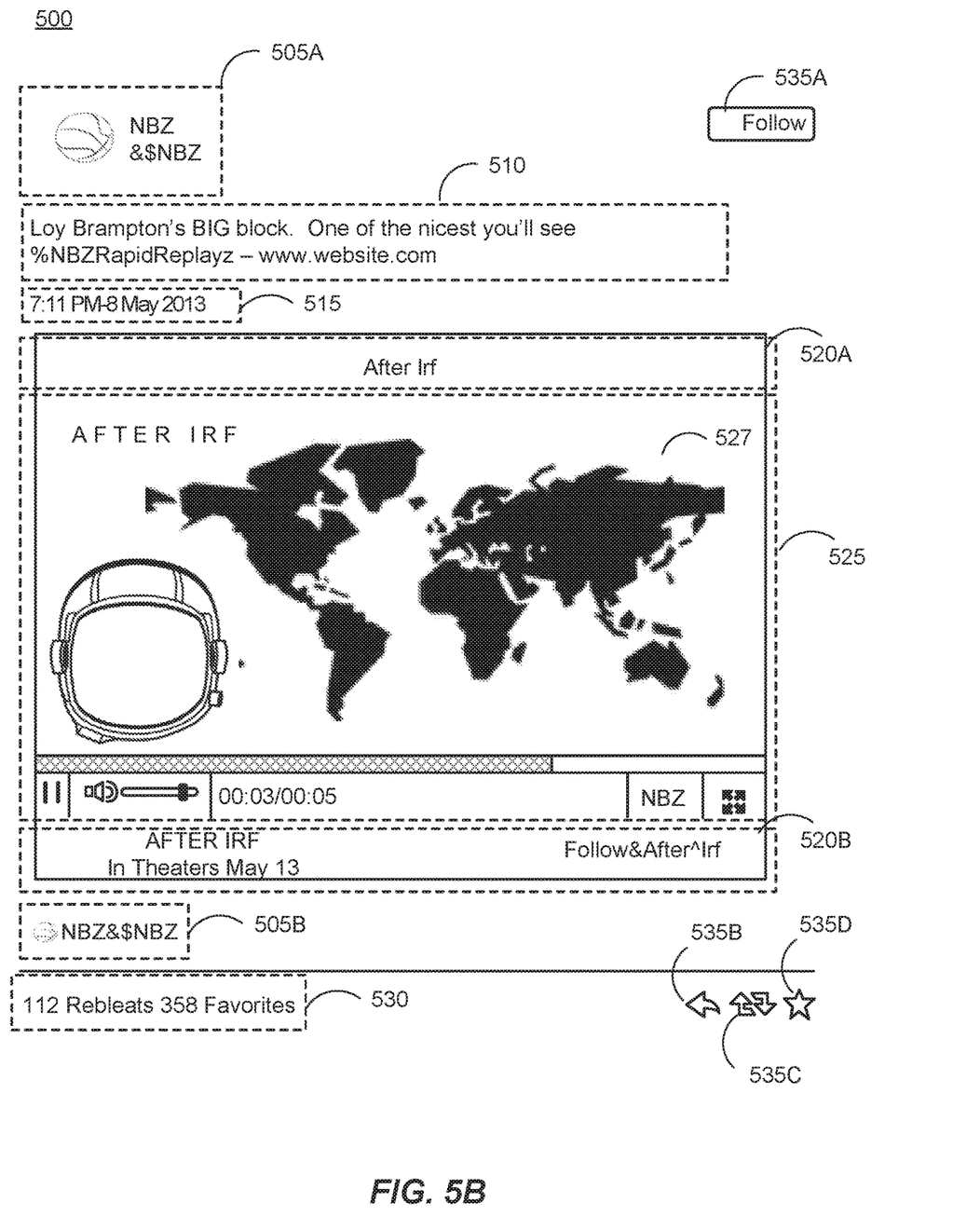

FIG. 5B illustrates the promoted SMCI 500 after an account selects the TBM player 525. Selecting the TBM player 525 reveals TBM player controls including a play or pause button, a volume control, graphical and numerical TBM content duration indicators, an author indicator, and a full-screen playback option. The promoted TBM content begins playing with a commercial advertisement 527 (example promotional information) for the movie advertised by the banner advertisements 520 (another example of promotional information). After the five-second commercial advertisement 527 has completed, more TBM content is displayed.

Figure 5C:
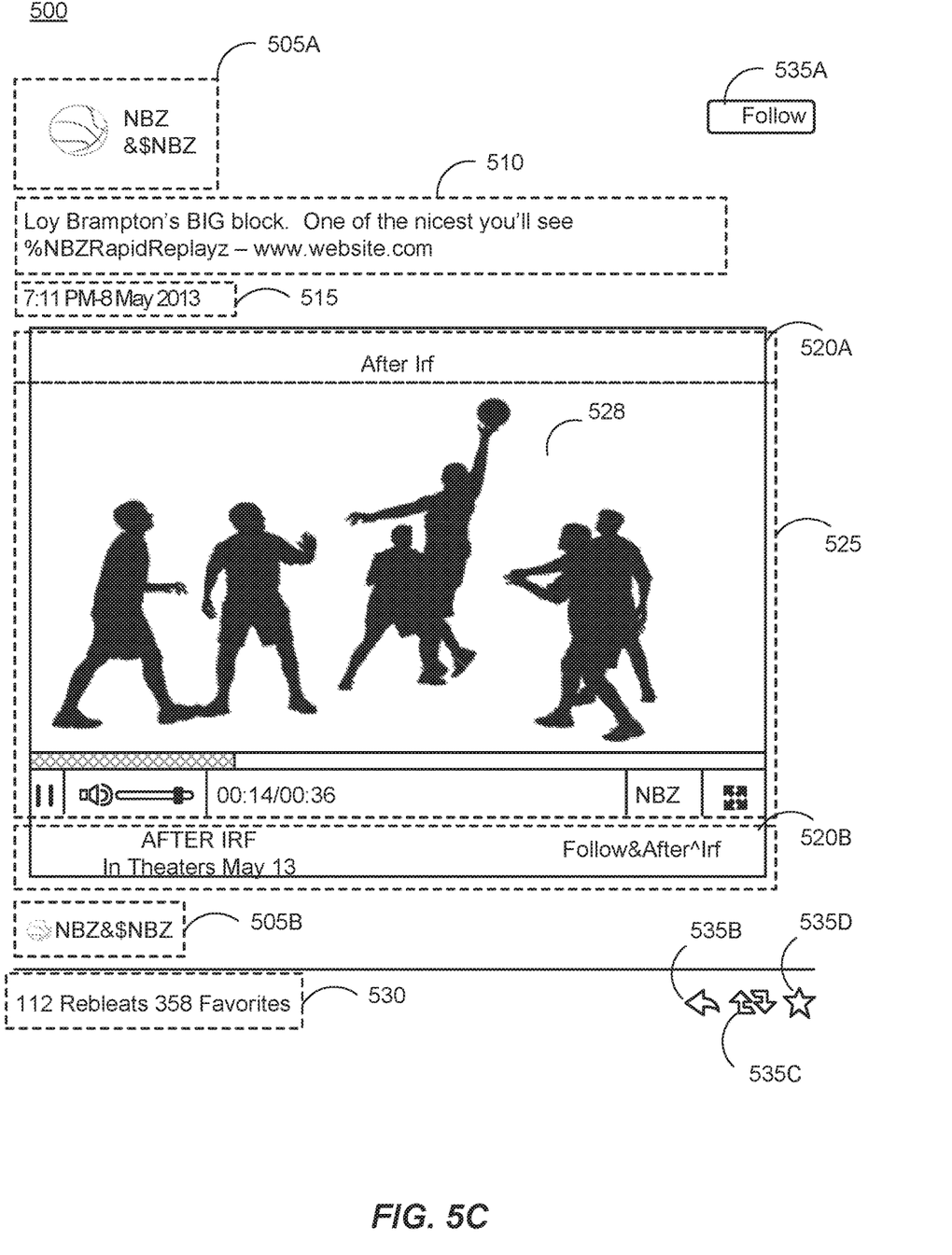
Figure 5D:
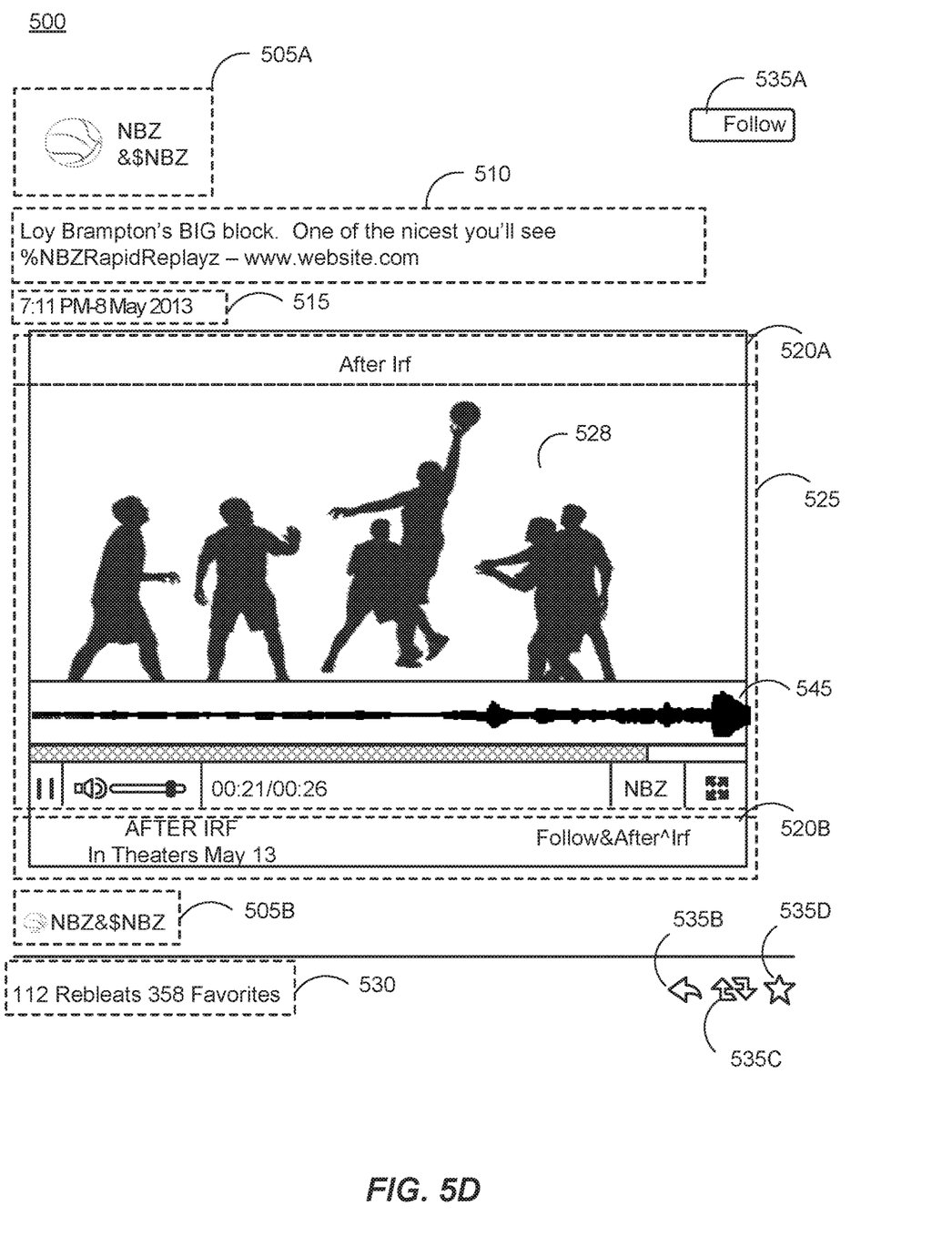

FIG. 5C illustrates the promoted SMCI 500 after the commercial advertisement 527 has played. The TBM player next plays TBM content 528 uploaded by a content distributor 120. In the example promoted SMCI 500, the distributor TBM content 528 is a replay from a basketball game. In one embodiment, an account may fast-forward or rewind the distributor TBM content by selecting a point on the graphical TBM content duration indicator.

FIG. 5D illustrates an alternate view of the promoted SMCI 500 while the distributor TBM content 528 is playing. The SMCI temporal intensity display 545 indicates the relative number of SMCIs discussing the TBM content 528 over time. SMCI temporal intensity may be determined from SMCIs over time while the TBM content is broadcast by the content distributor 120 by media such as television. In one embodiment, the relevance module 240 correlates account SMCIs with TBM content. Alternately or additionally, the SMCI temporal intensity is determined based on account interactions with the SMCI interaction options while watching the TBM content on the TBM content player 525.

ADDITIONAL CONSIDERATIONS

Embodiments may be implemented on virtually any type of computer regardless of the platform being used. For example, as shown in FIG. 2, a computer system includes one or more processor(s) 270 (such as a central processing unit (CPU), integrated circuit, a hardware processor), and a memory 280. One or more components of the computer system may be communicatively connected by a bus. The computer system may also include input means, such as a keyboard, a mouse, or a microphone. Further, the computer system may include output means, such as a display device. The computer system may be connected to the network 160 via a network adapter. Those skilled in the art will appreciate that many different types of computer systems exist, and the aforementioned input and output means may take other forms. Generally speaking, the computer system includes at least the minimal processing, input, and/or output means necessary to practice an embodiment.

Further, in one or more embodiments, one or more elements of the aforementioned computer system may be located at a remote location and connected to the other elements over a network. Further, embodiments may be implemented on a distributed system having a plurality of nodes, where portions of the SNS 140 (e.g., the TBM content store 215, the relevance module 240) may be located on a different node within the distributed system. In one embodiment, the node corresponds to a computer system. Alternatively, the node may correspond to a processor 280 with associated physical memory. The node may alternatively correspond to a processor 280 or micro-core of a processor 280 with shared memory and/or resources. The one or more processors 280 may also operate to support performance of the relevant operations in a "cloud computing" environment or as a "software as a service" (SaaS).

Further, one or more elements of the above described systems (e.g., the TBM content store 215, the relevance module 240 of FIG. 2) can be implemented as software instructions in the form of computer-readable program code stored, temporarily or permanently, on one or more non-transitory computer-readable storage media. The non-transitory computer-readable storage media (e.g., the memory 270) are executable by one or more computer processors 280 to perform the functionality of one or more components of the above-described systems (e.g., FIG. 2) and/or flowcharts (e.g., FIGS. 3A and 3B). Examples of non-transitory computer-readable media can include, but are not limited to, compact discs (CDs), a hard disk, a cache flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor 280 or a group of processors 280) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed embodiments. This description should be read to include one or at least one and the singular also includes the plural unless it is obvious that it is meant otherwise.

Upon reading this disclosure, those of skill in the art will appreciate still additional alternative structural and functional designs for the systems and processes described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method, comprising:
   receiving, from a content promoter associated with a social networking system, an indication of one or more topics of a set of topics associated with the social networking system;
   receiving, from a set of content distributors, a set of social media content items (SMCI) for distribution through a social networking system, each SMCI of the set of SMCI having one or more topics of the set of topics associated therewith;
   selecting, based on the one or more topics received from the content promoter and the one or more topics associated with each SMCI of the set of SMCI, a first SMCI of the set of SMCI, the first SMCI including a first video clip;
   receiving, from the content promoter, promotion information including a second video clip;
   modifying the first SMCI to include the promotion information to generate a modified first SMCI;
   transmitting the modified first SMCI to one or more of:
   a first set of users of the social networking system associated with the received one or more topics from the content promoter;
   a second set of users of the social networking system associated with the one or more topics associated with the first SMCI; or
   a third set of users of the social networking system associated with a first content distributor of the set of content distributors, the first content distributor providing the first SMCI.

2. The method of claim 1, the transmitting including transmitting the modified first SMCI to the first set of users of the social networking system associated with the received one or more topics from the content promoter.

3. The method of claim 2, further comprising, prior to the transmitting, identifying the first set of users as being associated with the received one or more topics from the content promoter.

4. The method of claim 3, the identifying including identifying the first set of users based on one or more of inferred interest, demographic information, and geographic location.

5. The method of claim 1, the transmitting including transmitting the modified first SMCI to the second set of users of the social networking system associated with the one or more topics associated with the first SMCI.

6. The method of claim 5, further comprising, prior to the transmitting, identifying the second set of users as being associated with the one or more topics associated with the first SMCI.

7. The method of claim 6, the identifying including identifying the second set of users based on one or more of inferred interest, demographic information, and geographic location.

8. The method of claim 1, the transmitting including transmitting the modified first SMCI to the third set of users of the social networking system associated with the first content distributor providing the first SMCI.

9. The method of claim 1, wherein the first video clip is a portion of a first video broadcast, the transmitting including transmitting the modified first SMCI concurrently with the first video broadcast.

10. The method of claim 1, wherein the first video clip is a portion of a first video broadcast, the transmitting including transmitting the modified first SMCI after the first video broadcast has ended.

11. The method of claim 1, the modifying including modifying the first SMCI to include the promotion information without notifying the content promoter.

12. The method of claim 1, the transmitting including transmitting the modified first SMCI without notifying the content promoter.

13. A system, comprising:
at least one processor; and
a computer-readable storage medium configured to store instructions that, when executed, cause the at least one processor to:
  receive, from a content promoter associated with a social networking system, an indication of one or more topics of a set of topics associated with the social networking system;
  receive, from a set of content distributors, a set of social media content items (SMCI) for distribution through a social networking system, each SMCI of the set of SMCI having one or more topics of the set of topics associated therewith;
  select, based on the one or more topics received from the content promoter and the one or more topics associated with each SMCI of the set of SMCI, a first SMCI of the set of SMCI;
  transmit, to the content promoter, an indication of the first SMCI;
  receive, from the content promoter and responsive to the indication of the first SMCI, promotion information;
  modify the first SMCI to include the promotion information to generate a modified first SMCI;
  transmit the modified first SMCI to one or more of:
    a first set of users of the social networking system associated with the received one or more topics from the content promoter;
    a second set of users of the social networking system associated with the one or more topics associated with the first SMCI; or
    a third set of users of the social networking system associated with a first content distributor of the set of content distributors, the first content distributor providing the first SMCI.

14. The system of claim 13, wherein the first SMCI includes a video clip and wherein the promotion information includes text, and wherein the instructions, when executed, further cause the processor to modify the first SMCI by including the text within or adjacent to the video clip to generate the modified first SMCI.

15. The system of claim 13, wherein the first SMCI includes a video clip and wherein the promotion information includes an image, and wherein the instructions, when executed, further cause the processor to modify the first SMCI by including the image within or adjacent to the video clip to generate the modified first SMCI.

16. The system of claim 13, wherein the first SMCI includes a video clip, wherein the video clip is a portion of a first video broadcast,
wherein the instructions, when executed, further cause the processor to transmit the modified first SMCI by transmitting the modified first SMCI concurrently with the first video broadcast, and
wherein the modified first SMCI includes a link to the first video broadcast.

17. A non-transitory computer readable medium comprising instructions that, when executed by at least one processor, cause the at least one processor to:
  receive, from a content promoter associated with a social networking system, an indication of one or more content topics of a set of predetermined content topics associated with the social networking system;
  receive, from a set of content distributors, a set of social media content items (SMCI) for distribution through a social networking system, each SMCI of the set of SMCI having metadata associated therewith, the metadata including
    one or more topics of the set of topics associated with that SMCI; and
    distribution information for that SMCI;
  select, based on the one or more topics received from the content promoter and the metadata of each SMCI of the set of SMCI, a first SMCI of the set of SMCI, the first SMCI including a first video clip;
  receive, from the content promoter, promotion information;
  modify the first SMCI to include the promotion information to generate a modified first SMCI;
  transmit the modified first SMCI to one or more users of the social networking system.

18. The non-transitory computer readable medium of claim 17, wherein the distribution information includes:
  a specification of one or more distribution channels; and
  for each distribution channel, target user information, anticipated user information, or both.

19. The non-transitory computer readable medium of claim 17, wherein the set of predetermined content topics includes one or more of a genre, a genre and at least one corresponding sub-genre, an event, a personality, an entity, a location, and an object.

20. The non-transitory computer readable medium of claim 17 wherein the instructions further include instructions that, when executed, cause the at least one processor to identify the one or more users based on metadata associated with the one or more users, wherein the metadata associated with the one or more users identifies the one or more users as having one or more of:
  an inferred interest in the first SMCI;
  a demographic profile that corresponds to the distribution information of the metadata of the first SMCI; and
  a geographic profile that corresponds to the distribution information of the metadata of the first SMCI.

* * * * *